United States Patent [19]

Fiumano et al.

[11] Patent Number: 5,205,938

[45] Date of Patent: Apr. 27, 1993

[54] POLYESTER BAG FILTER

[75] Inventors: Frank A. Fiumano, East Meadow; Colin F. Harwood, Glen Cove; Carl H. Meyers, Great Neck, all of N.Y.

[73] Assignee: Pall Corporation, East Hills, N.Y.

[21] Appl. No.: 850,657

[22] Filed: Mar. 12, 1992

[51] Int. Cl.$^5$ .................. B01D 61/00; B01D 27/00
[52] U.S. Cl. ............................ 210/653; 210/445; 210/453; 210/484; 210/232
[58] Field of Search ............... 210/799, 232, 445, 294, 210/295, 452, 484, 500.1, 500.27, 453, 167, 448, 653, 500.1, 654, 490, 445, 452, 453, 484, 448, 649, 653; 55/382, 341.1

[56] References Cited

U.S. PATENT DOCUMENTS

| | | | |
|---|---|---|---|
| 3,814,261 | 6/1974 | Morgan, Sr. | 210/453 |
| 3,960,728 | 6/1976 | Otzen | 210/167 |
| 4,081,379 | 3/1978 | Smith | 210/232 |
| 4,164,400 | 8/1979 | Wald | 55/498 |
| 4,257,791 | 3/1981 | Wald | 55/382 |
| 4,336,035 | 6/1982 | Evenstad et al. | 55/341.1 |
| 4,581,957 | 7/1985 | Malik | 210/489 |
| 4,976,868 | 12/1990 | Sartori et al. | 210/654 |
| 5,045,194 | 9/1991 | Gershenson | 210/445 |
| 5,137,632 | 8/1992 | Morgan, Sr. | 210/453 |

OTHER PUBLICATIONS

Pall Selection Guide, Profile ® Bag Filters (Element Data Sheet E26a, 1989).
Rosedale Beta Bag ® Filter Bags (Catalog Beta-100, 1986).

*Primary Examiner*—Robert A. Dawson
*Assistant Examiner*—Ana M. Fortuna
*Attorney, Agent, or Firm*—Leydig, Voit & Mayer

[57] ABSTRACT

A bag filter comprising at least one sheet of a polyester filter medium, preferably a polyester high dirt capacity filter medium, having a graded pore structure which has been formed into a bag configuration with an opening, an inside surface, an outside surface, and at least one seam formed at adjoining filter medium portions which have been sewn together and optionally sealed with a thermoplastic tape that has been heat-sealed to the adjoining filter medium portions.

19 Claims, No Drawings

POLYESTER BAG FILTER

TECHNICAL FIELD OF THE INVENTION

This invention relates to a bag filter comprising at least one sheet of a polyester filter medium formed into a bag configuration with sewn seams. The polyester bag filter may also utilize a thermoplastic tape which has been heat-sealed to the adjoining portions of the filter medium at the seams.

BACKGROUND OF THE INVENTION

Bag filters are typically formed from sheets of flexible material which are joined together, usually by sewing such sheets together.

Bag filters prepared from high dirt capacity polypropylene filter media sheets which have been sewn together are commercially available from Pall Corporation (Glen Cove, N.Y.) under the trademark Profile ®. While such bag filters can be used in various end-uses and have a graded pore structure which provides for a high dirt capacity, the polypropylene bag filters are not suitable for use in certain environments, such as in the filtering of aluminum processing fluids where high oxidation conditions and aromatic liquids may be encountered.

Bag filters from other materials, such as polyester, have been prepared for use in the aluminum processing industry using a medium made from coarse fibered felt or of a woven construction. While such bag filters are suitable for use in high oxidation situations and/or with aromatic liquids, such bag filters are quite inferior to the polypropylene bag filters with graded pore structure with respect to pore ratings and dirt capacity.

There remains, therefore, a need for a bag filter which has a high dirt capacity and which is resistant to high oxidative conditions and aromatic solvents. Such a bag filter would prove particularly useful in filtering aluminum processing fluids which contain high amounts of aromatic solvents. Such a bag filter should also have seams constructed in such a manner so as not to allow the fluid being filtered to bypass the filter medium by way of the seams, while at the same time providing for a good mechanical bond at the bag filter seams. The present invention provides such a bag filter.

BRIEF SUMMARY OF THE INVENTION

It is an object of the present invention to provide a bag filter which has a high dirt capacity and is resistant to aromatic fluids.

It is another object of the present invention to provide a bag filter which is suitable for use in high oxidative conditions.

It is a further object of the present invention to provide a bag filter having seams which have a high mechanical strength while minimizing, and preferably eliminating, fluid leakage pathways.

These and other objects and advantages of this invention, as well as additional inventive features, will become apparent from the description of the present invention provided herein.

The present invention concerns a bag filter comprising at least one sheet of a polyester filter medium having a graded pore structure which has been formed into a bag configuration with an opening, an inside surface, an outside surface, and at least one seam formed at adjoining filter medium portions which have been sewn together. The seams of the bag filter may be sealed with a thermoplastic tape that has been heat-sealed to the adjoining filter medium portions.

DETAILED DESCRIPTION OF THE PREFERRED EMBODIMENTS

The present inventive bag filter comprises at least one sheet of a polyester filter medium having a graded pore structure which has been formed into a bag configuration. The bag filter will typically have an opening, an inside surface, an outside surface, and at least one seam formed at adjoining filter portions which have been sewn together. The seams of the bag filter may be sealed with a thermoplastic tape that has been heat-sealed to the adjoining filter medium portions.

The bag filter may be of any suitable configuration and size. Conventional bag filters are roughly cylindrical in shape and are available in sizes of 4 and 7 inch diameter and 9, 15, 17, and 33 inch length.

The filter medium comprises a polyester sheet material and is preferably entirely of polyester. Since the polyester filter medium will be sewn into a bag configuration, the filter medium should be of a form which can be sewn and preferably also heat-sealed with a suitable thermoplastic tape. The filter medium is preferably a high dirt capacity filter medium. The preferred high dirt capacity filter medium comprises a melt-blown fibrous web of polyester fibers intertwined and layered on a porous polyester substrate, similar to the configuration used with polypropylene fibers in the Profile ® bag filters available from Pall Corporation (Glen Cove, N.Y.). The porous polyester substrate may be of any suitable material and is preferably a polyester copolymer such as Reemay 2430 (Intertech) or Lutradur 662W (Freudenberg).

The porosity of the filter medium of the bag filter may be any desired value, e.g., 5 $\mu$m, 10 $\mu$m, 20 $\mu$m, and up to 120 $\mu$m or more. The bag filter will have a tapered or graded pore structure, preferably with decreasing pore size in the direction of fluid flow. Since the usual direction of fluid flow will be from the inside to the outside of the bag filter, the bag filter will usually have a decreasing pore size from the inside surface of the bag filter to the outside surface of the bag filter.

The bag filter may comprise one or more layers of the filter medium. When two or more filter medium sheets are layered, the filter medium sheets may have the same or different pore ratings. Preferably, multiple-layered filter medium sheets include filter media having generally decreasing pore size in the direction of fluid flow, most typically from the inside to the outside of the bag filter.

The bag filter may comprise other layers in addition to the filter sheet material, such as an inner liner and outer wrap of a non-woven material, preferably of polyester or a polyester copolymer.

The bag filter may be formed from one or more single or multiple-layered sets of sheets of filter medium. The number of such sheets employed will depend in part upon the ultimate shape of the bag filter and its use. In most instances, a bag filter can be prepared with only one or two filter medium sheets which will desirably minimize the extent of seams. Most preferably, the bag filter is constructed from a single sheet of filter medium, thereby resulting in the existence of only a single seam joining the edges of the sheet so as to leave an open end. In all cases, the overall shape of the bag filter should be such that a particular seam or area of a seam is not subjected to added stress through use that would destroy the integrity of the seam.

The material, size, and nature of the thread used to join filter medium portions to form the bag filter depends upon the filter medium, the other materials which may be used to form the bag filter, and the ultimate use of the bag. The thread preferably is of the same material as the filter medium, i.e., polyester.

The number of stitches/inch used to join the filter medium portions of the bag filter will vary with the filter medium, the number of layers of filter medium, the thread, the type of stitching, and the ultimate use of the bag filter. It is important that sufficient stitches be employed to ensure an adequate mechanical bond between adjoined filter medium portions, while, however, ensuring that the number of stitches/inch is not such that the stitching results in the perforation or weakened integrity of the filter medium.

The manner in which the seam on the bag filter is sewn may be varied. For example, the seam may be straight-stitched, with a binder strip preferably inserted between the edges of the filter medium prior to sewing the seam, or the seam may be over-stitched. When used, the binder strip is preferably of the same type of material as the filter medium and/or thread, e.g., polyester.

While in most uses the sewn seams of such bag filters do not affect the integrity of the bag filters, there are some instances in which the sewn seams of conventional bag filters can become leakage pathways depending upon the nature of the fluids being filtered and the pressure at which filtration is being effected. In those instances, the seams of the bag filter may be sealed with a thermoplastic tape that has been heat-sealed to the adjoining filter medium portions.

Any suitable thermoplastic tape may be used, preferably a thermoplastic tape which has a melting temperature lower than the melting temperature of the filter medium and/or thread of the bag filter and which will provide a suitable seal with the adjoined filter medium portions. The thermoplastic tape is preferably a polyester copolymer having a melting temperature below that of the polyester filter medium.

It should be kept in mind that the choice of thermoplastic tape will depend in part upon the amount of heat and pressure that can be applied to the thermoplastic tape on the filter medium to effect the heat-seal without disrupting the integrity of the bag filter. The choice of thermoplastic tape also will depend on the ultimate use of the bag filter. For example, the bag filter may be used under conditions that may adversely affect the heat-seal effected between the thermoplastic tape and the filter medium, in which case it will be necessary to choose an appropriate thermoplastic tape to withstand the anticipated operating conditions.

Another consideration in the choice of the thermoplastic tape is its width. The width of the tape must be sufficient to effectively seal the seam.

The thermoplastic tape may be applied to either the inside or the outside surface of the bag filter. Alternatively, or in addition, the thermoplastic tape may be inserted between the adjoining filter medium portions prior to stitching them together. It is preferred that the thermoplastic tape be applied to cover the seam on the outside surface of the bag filter. The thermoplastic tape is preferably positioned such that the seam is midway between the edges of the tape. Furthermore, the thermoplastic tape preferably extends beyond the ends of the seam to the extent possible.

Once the thermoplastic tape has been properly positioned with respect to the seam, the thermoplastic tape is subjected to sufficient heat and pressure to effect a heat-seal between the thermoplastic tape and the adjoining filter medium portions. The amount of heat and pressure required to heat-seal the tape will depend in part on the particular thermoplastic tape and filter medium used in the bag filter. The applied heat and pressure, of course, should not be so great as to destroy the integrity of the bag filter. In the preferred embodiment wherein a polyester copolymer thermoplastic tape is utilized, hot air may be used to heat the thermoplastic tape on the bag filter which is then passed through rollers to effect the heat-seal.

A suitable collar may be sewn onto the open end of the bag filter, with the resulting seam being treated as described above with respect to adjoining filter medium portions. The collar may be of any suitable material, generally an elastomeric compound of the same general type as used in the filter medium. The collar material is preferably made of a polyester material, e.g., a polyester copolymer such as Geolast ® and Alcryn ® 2060 NC (both available from DuPont).

If a collar is attached to the open end of the bag filter, care should be exercised in choosing the stitch length to ensure that the collar is not perforated. Similarly, if a thermoplastic tape is used to seal the collar seams, then care should be exercised in choosing the thermoplastic tape so that the thermoplastic tape effectively heat-seals to both the filter medium and the collar.

The polyester bag filter of the present invention has a variety of suitable end uses. In particular, the bag filter may be used to filter paints and coatings, especially hydrocarbon-based paints and primers, chemicals, petrochemical products, and the like. The present inventive bag filter is most suitable for filtering fluids containing aromatics such as benzene, toluene, xylene, gasoline, and kerosene, aliphatics such as hexane and octane, fats, oils, and freons, as well as other compounds which may degrade non-polyester filters such as prepared from polypropylene or nylon. The present inventive bag filter is particularly well suited for filtering aluminum processing fluids, such as roll mill coolant fluids, which contain aromatic solvents. The bag filters of the present invention are also well suited for use in high oxidative conditions, such as may be encountered in processing liquid fluids containing oxidants, as well as dry air or other oxidizing gaseous fluids, particularly at elevated temperatures. The utility of the bag filter is in no way limited to these uses and includes most uses for conventional bag filters.

The following examples serve to further illustrate the present invention but is not intended to limit the scope of the invention.

EXAMPLE 1

Filter bags of 70, 90, and 120 μm pore ratings were prepared in accordance with the present invention. Each of the bag filters were constructed in a similar manner. A single sheet of a high dirt capacity polyester filter medium with a graded pore structure, together with non-woven, non-fiber shedding, polyester inner liner and outer wrap of Reemay 2430 (Intertech), were stitched together using a polyester thread (size #69) along the top (collar) edge in the flat, prior to being stitched on the side and bottom in a single seam to form a bag configuration of size 7 inch diameter by 33 inch length.

The bag filter was sewn inside-out with a sewing machine using a single chain stitch of 7-11 stitches/inch with a minimum thread tension of 12 oz. and a minimum bobbin tension of 6 oz. The minimum tensions set on the sewing machine are necessary to ensure tight seams. The needle used did not exceed size 140.

The edges of the sheet of the filter medium were stitched as close as practical to the edge of the binder strip. No gaps were allowed in the seam, and all layers comprising the bag filter were captured in the seam. Thread ends were cut approximately ½ inch long.

Since a collar was to be attached to the open end of the bag filter, the diameter of the bag filter was narrowed to the diameter of the collar, beginning 1-½ inches from the open end of the bag filter.

After sewing and trimming the threads, the bag filter was turned inside-out. The bottom and side seam were pushed out to provide a well-defined contour to the bag. The bottom contour was checked for symmetry.

A collar of Alcryn° (DuPont) was attached to the open end of the bag with a lock stitch (5-8 stitches-/inch) located ¼-½ inch from the bottom of the collar, with ends of the stitching passing each other circumferentially at least ½ inch. It was ensured that the stitching was not so tight as to perforate the collar. Thread ends at the collar were trimmed to within ⅛ inch to complete the bag filters.

EXAMPLE 2

The 70, 90, and 120 μm pore rated polyester bag filters of Example 1 were compared in an industrial environment with a commercial Rosedale polyester felt bag filters having nominal pore ratings of 1 and 25 μm. The present inventive filter bags had a 99% removal efficiency at each of the pore ratings. The Rosedale bag filters had highly variable removal ratings. The 1 μm Rosedale bag filter had a 99% removal efficiency at about 90-120 μm, while the 25 μm Rosedale bag filter had a 99% removal efficiency at about 140 μm and greater. The removal efficiencies of the present inventive and Rosedale bag filters were determined using an OSU modified F2 test.

The present inventive and Rosedale ba filters were evaluated in an aluminum processing plant as bypass filters to filter the roll mill coolant fluid Kermac 600 (Kerr-McGee) which contains about 12% aromatic solvents. The bag filters functioned to filter the roll mill coolant fluid for 20-30 minute cycles when the primary filtering material was being indexed. The various bag filters were tested to a terminal delta pressure of 50 psi. The number of cycles were measured up until the terminal delta pressure was reached, and the results of the testing are set forth below:

| Bag Filter | 99% Removal Rating | Number of Cycles |
|---|---|---|
| Rosedale | 90-120 μm | 3 |
| Invention | 90 μm | 112 |
| Rosedale | 140+ μm | 30 |
| Invention | 120 μm | 60* |

(*test terminated with negligible increase in delta pressure)

In addition, the visual clarity of the filtered fluid exiting from the present inventive bag filters, for both the 90 and 120 μm pore ratings, was reported to be superior to that with respect to the Rosedale bag filters.

Accordingly, the polyester bag filters of the present invention are far superior to conventional polyester bag filters as regards useful life and dirt capacity.

While this invention has been described with emphasis upon preferred embodiments, it will be obvious to those of ordinary skill in the art that the preferred bag filter may be varied. It is intended that the invention may be practiced otherwise than as specifically described herein. Accordingly, this invention includes all modifications encompassed within the spirit and scope of the following claims.

What is claimed is:

1. A bag filter comprising at least one sheet of a filter medium comprising a melt-blown fibrous web of polyester fibers intertwined and layered on a porous polyester substrate and having a graded pore structure formed into a bag configuration with an opening, an inside surface, an outside surface, and at least two adjoining portions sewn together with thread to form a seam.

2. The bag filter of claim 1, wherein said thread comprises polyester.

3. The bag filter of claim 2, wherein said seams are sealed with a thermoplastic tape that has been heat-sealed to the adjoining filter medium portions.

4. The bag filter of claim 3, wherein said thermoplastic tape comprises polyester.

5. The bag filter of claim 4, wherein said thermoplastic tape comprises a polyester copolymer having a melting temperature lower than the melting temperature of said filter medium.

6. The bag filter of claim 2, wherein said substrate forms the inside surface of said bag filter.

7. The bag filter of claim 1, wherein said bag filter further comprises a collar sewn onto the open end of said bag filter with at least one seam at the junction of said collar and said filter medium.

8. The bag filter of claim 7, wherein said collar comprises an elastomeric material.

9. The bag filter of claim 8, wherein said collar comprises a polyester copolymer.

10. The bag filter of claim 9, wherein said collar seams are sealed with a thermoplastic tape that has been heat-sealed to the adjoining portions of said filter medium and said collar.

11. The bag filter of claim 1, wherein said bag filter further comprises a binder strip between adjoining filter medium portions sewn together.

12. The bag filter of claim 11, wherein said binder strip is polyester.

13. A method of processing a fluid, which method comprises a fluid with a bag filter comprising at least one sheet of a filter medium comprising a melt-blown fibrous web of polyester fibers intertwined and layered on a porous polyester substrate and having a graded pore structure formed into a bag configuration with an opening, an inside surface, an outside surface, and at least two adjoining portions sewn together with thread to form a seam.

14. The method of claim 13, wherein said fluid is a liquid fluid containing aromatic solvents.

15. The method of claim 13, wherein said thread is polyester.

16. The method of claim 15, wherein said bag filter further comprises a polyester binder strip between adjoining filter medium portions sewn together and a collar comprising a polyester copolymer sewn with polyester thread onto the open end of said bag filter with at least one seam at the junction of said collar and said filter medium.

17. The method of claim 16, wherein said fluid is a liquid fluid containing aromatic solvents.

18. The method of claim 15, wherein said fluid is a liquid fluid containing aromatic solvents.

19. A bag filter comprising (a) one sheet of a filter medium comprising a melt-blown fibrous web of polyester fibers intertwined and layered on a porous polyester substrate and having a graded pore structure formed into a bag configuration with an opening, an inside surface, an outside surface, and at least two adjoining portions with a polyester binder strip therebetween and sewn together with polyester thread to from a seam and (b) a collar comprising a polyester copolymer sewn with polyester thread onto said opening of said bag-configured filter medium with one seam at the junction of said collar and said filter medium.

* * * * *